United States Patent [19]

Takasuga

[11] 4,455,189
[45] Jun. 19, 1984

[54] SHEET JOINING APPARATUS
[75] Inventor: Yutaka Takasuga, Kodaira, Japan
[73] Assignee: Bridgestone Tire Company Limited, Tokyo, Japan
[21] Appl. No.: 511,895
[22] Filed: Jul. 8, 1983
[51] Int. Cl.³ ................... B65H 69/02; B65H 69/06
[52] U.S. Cl. ................................ 156/502; 156/157; 156/558; 156/559
[58] Field of Search ............... 156/157, 266, 502, 558, 156/559

[56] References Cited
U.S. PATENT DOCUMENTS

| | | | |
|---|---|---|---|
| 3,100,731 | 8/1963 | Brey | 156/157 |
| 4,025,384 | 5/1977 | Shiozaki et al. | 156/502 |
| 4,126,508 | 11/1978 | Hoelzinger | 156/559 |
| 4,151,038 | 4/1979 | Bottasso et al. | 156/558 |
| 4,328,064 | 5/1982 | Miller, Jr. et al. | 156/558 |

Primary Examiner—Michael G. Wityshyn
Attorney, Agent, or Firm—Cushman, Darby & Cushman

[57] ABSTRACT

An apparatus for joining sheet segments, typically rubberized, to one another to form an elongated strip, wherein a strip composed of sheet segments joined together is conveyed into a joining zone between rear and front conveyance zones in such a manner that the strip has a trailing end portion slightly projecting rearwardly from the rearmost ends of guide rails extending through the joining zone and front conveyance zone, whereupon a vertically movable pressing surface is brought into pressing contact with the trailing edge of the strip for causing the trailing edge to extend at a desired angle to a transverse direction of the joining zone. A sheet segment to be joined to such a strip is conveyed into the joining zone under the guidance of a vertically movable ride-on surface whereupon vertically movable edge portions are brought into pressing contact with the leading edge of the sheet segment for causing the leading edge to extend in parallel with the trailing edge of the strip. The pressing and ride-on surfaces and the edge portions are then withdrawn whereupon pressing rollers are brought into contact with a leading end portion of the sheet segment overlapped by a trailing end portion of the strip so that the overlapped portions of the strip and sheet segment are joined together.

9 Claims, 14 Drawing Figures

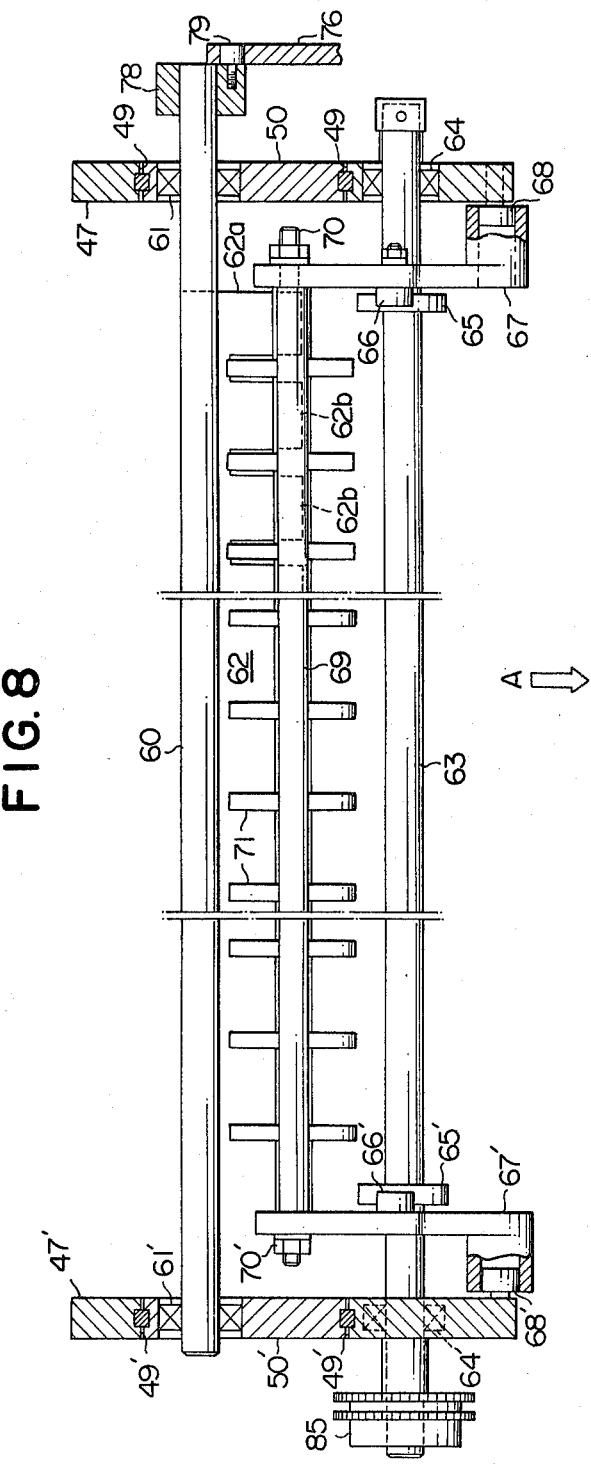

SHEET JOINING APPARATUS

FIELD OF THE INVENTION

The present invention relates to a sheet joining apparatus for joining a plurality of sheet segments to one another to form an elongated strip which is lengthwise composed of the sheet segments.

BACKGROUND OF THE INVENTION

During manufacture of pneumatic tires a fiber-reinforced, rubberized elongated strip is cut into segments of a predetermined length at predetermined intervals at a predetermined bias angle throughout the length of the strip. The sheet segments thus produced are then joined to one another with a front marginal portion of one segment lapped onto a rear marginal portion of another until the segments form an elongated strip, or fabric ply. A known example of a sheet joining apparatus used for the production of such a fabric ply is shown in Japanese Provisional Patent Publication No. 53-2573. The sheet joining apparatus disclosed therein however is composed of a disproportionately large number of component units and members involving extremely intricate motions and requiring various laborious adjustments. The prior-art sheet joining apparatus thus requires much time and labor for the adjustment of such members and units and is for this reason not operable for the manufacture of fabric plies with an acceptable degree of production efficiency. The present invention contemplates resolution of such a problem encountered in a prior-art sheet joining apparatus. It is accordingly a prime object of the present invention to provide a sheet joining apparatus which is simple in construction and capable of providing an increased production efficiency.

SUMMARY OF THE INVENTION

In accordance with the present invention, there is provided a sheet joining apparatus for joining a plurality of sheet segments to one another to form an elongated strip which is lengthwise composed of the sheet segments, comprising an elongated frame structure having rearmost and foremost ends and defining therein a front conveyance zone extending forwardly from the rearmost end of the frame structure, a rear conveyance zone extending rearwardly from the foremost end of the frame structure and an intermediate joining zone extending between the rear and front conveyance zones; first sheet conveying means operative to convey each of the sheet segments forwardly away from the rearmost end of the rear conveyance zone to the joining zone; second sheet conveying means operative to convey a strip formed in the joining zone forwardly from the joining zone toward the foremost end of the front conveyance zone; the first and second conveying means overlapping each other in the joining zone transversely of the frame structure and forming a horizontal transfer plane in the joining zone; first edge-adjusting means provided in the joining zone and comprising a plurality of pressing surfaces which are arranged in alignment with each other on a vertical plane directed at a predetermined angle to a transverse direction of the frame structure and which are angularly movable about an axis fixed with respect to the frame structure and parallel with the aforesaid vertical plane each between a generally vertical first angular position lower than the aforesaid transfer plane and a second angular position higher than the transfer plane, and a plurality of upper ride-on surfaces which are arranged in parallel with the aforesaid vertical plane and which are angularly movable with the pressing surfaces about the axis each between a first angular position lower than the aforesaid transfer plane and a forwardly and upwardly slanting second angular position having its foremost end located above the aforesaid transfer plane and its rearmost end located below the transfer plane, the pressing surfaces in the second angular positions thereof being engageable with the trailing edge of the strip for forcing a trailing end portion of the strip forwardly in the joining zone and thereby causing the trailing edge of the strip to extend in parallel with the aforesaid vertical plane when the strip is located immediately in front of the pressing surfaces, and the ride-on surfaces in the second angular positions thereof being operative to guide a leading end portion of a sheet segment to slide on the ride-on surfaces to a angular position vertically overlapping the trailing end portion of the strip formed in the joining zone; second edge-adjusting means comprising a plurality of downwardly directed edge portions which are positioned above the ride-on surfaces and which are arranged in parallel with the aforesaid vertical plane, the edge portions being angularly movable about an axis fixed with respect to the frame structure and parallel with the vertical plane each between a first angular position having its lowermost end located on a predetermined horizontal plane above the aforesaid transfer plane, a second angular position having its lower end located below the predetermined horizontal plane and above the aforesaid transfer plane and a third angular position having its lowermost end located on the transfer plane, the edge portions in the second angular positions thereof being engageable with the leading edge of a sheet segment forwardly conveyed into the joining zone by the first conveying means for causing the leading edge of the segment to extend in parallel with the vertical plane; and pressing means provided in the joining zone and arranged in parallel with the vertical plane, the pressing means being operative to press the leading end portion of the sheet segment against the trailing end portion of the strip in the joining zone after the ride-on surfaces are withdrawn from the second angular positions to the first angular positions thereof with the leading end portion of the sheet segment lapped onto the trailing end portion of the strip.

BRIEF DESCRIPTION OF THE DRAWINGS

The features and advantages of a sheet joining apparatus according to the present invention will be more clearly appreciated from the following description taken in conjunction with the accompanying drawings in which:

FIG. 8 is a horizontal sectional view taken on planes indicated by lines VIII—VIII in FIG. 6.

DESCRIPTION OF THE PREFERRED EMBODIMENT

Figure 1:
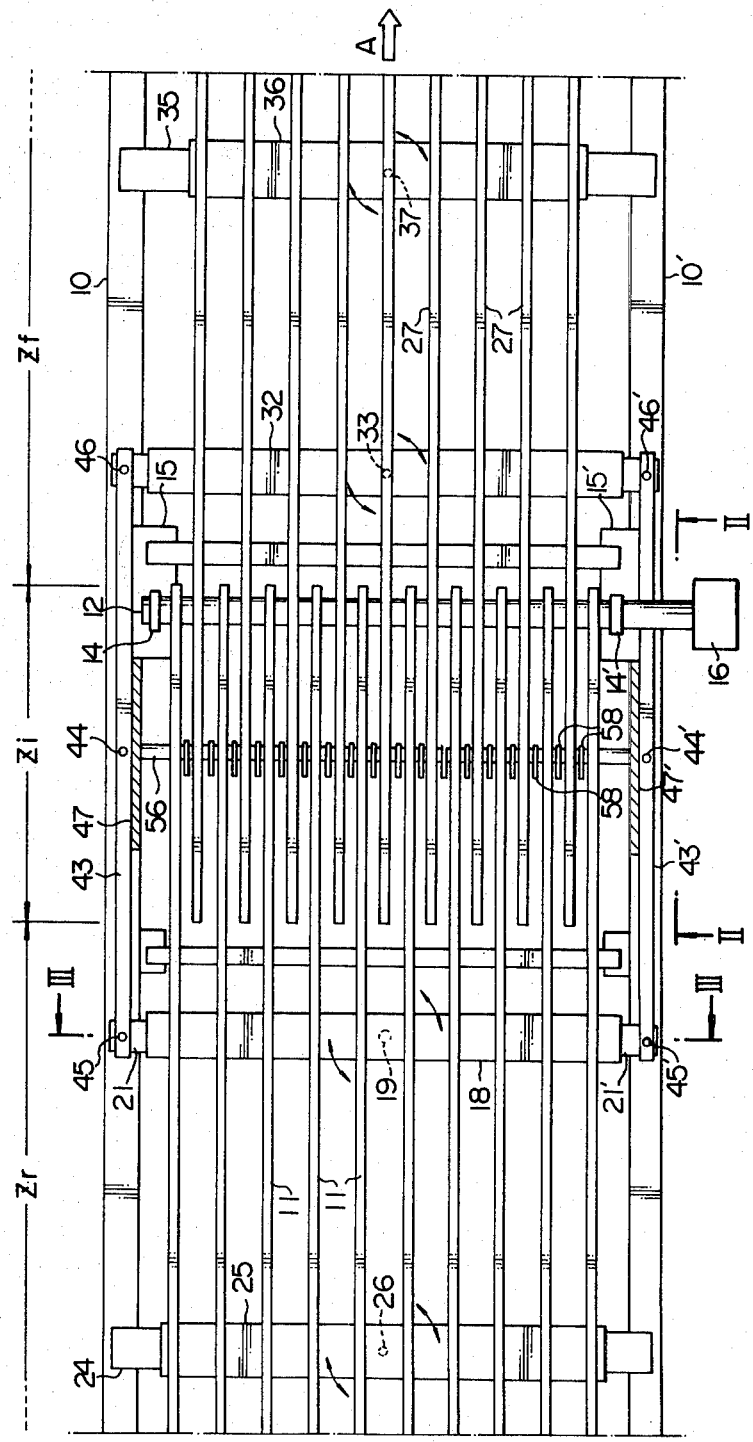
FIG. 1 is a plan view showing the overall construction and arrangement of a sheet joining apparatus embodying the present invention.
Figure 2:
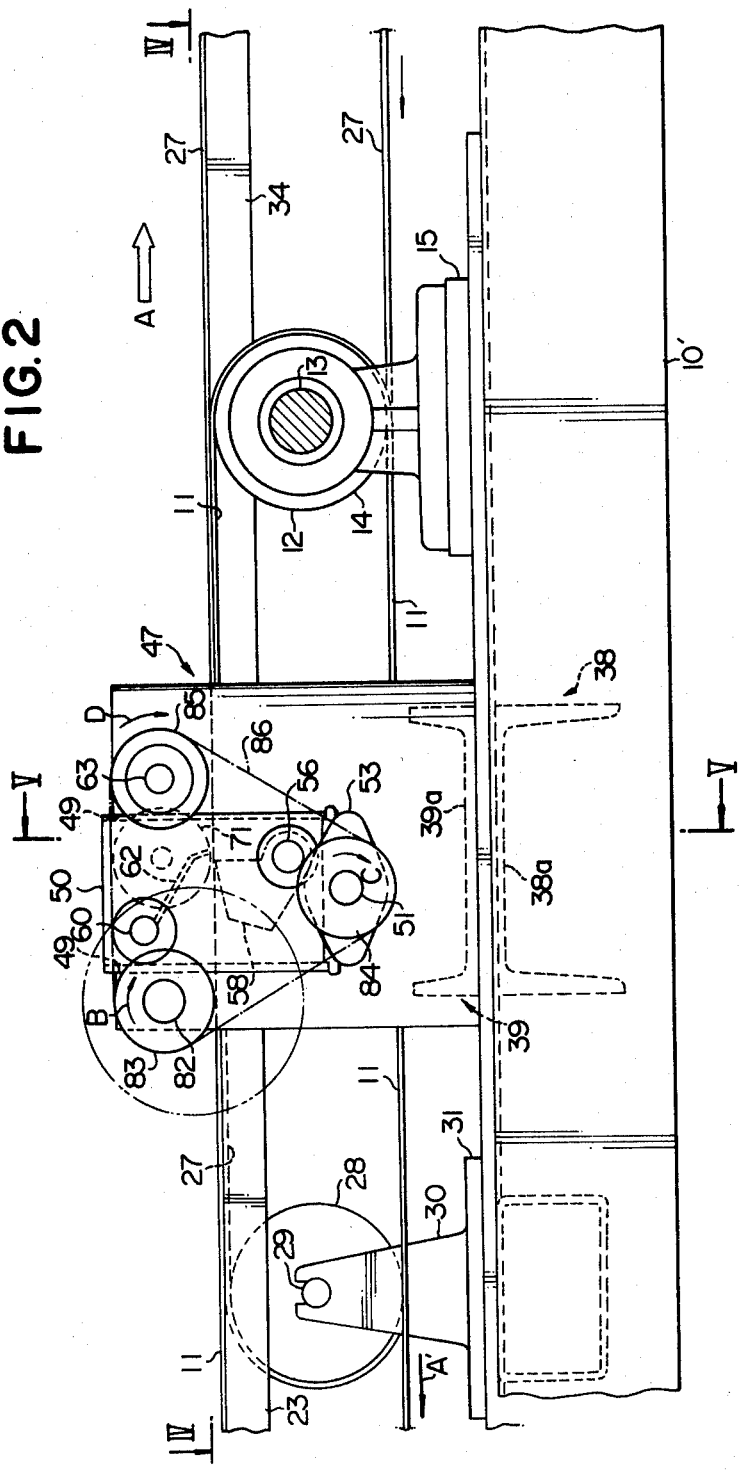
FIG. 2 is a side elevation view of the sheet joining apparatus viewed from a vertical plane indicated by line II—II in FIG. 1.
Figure 3:
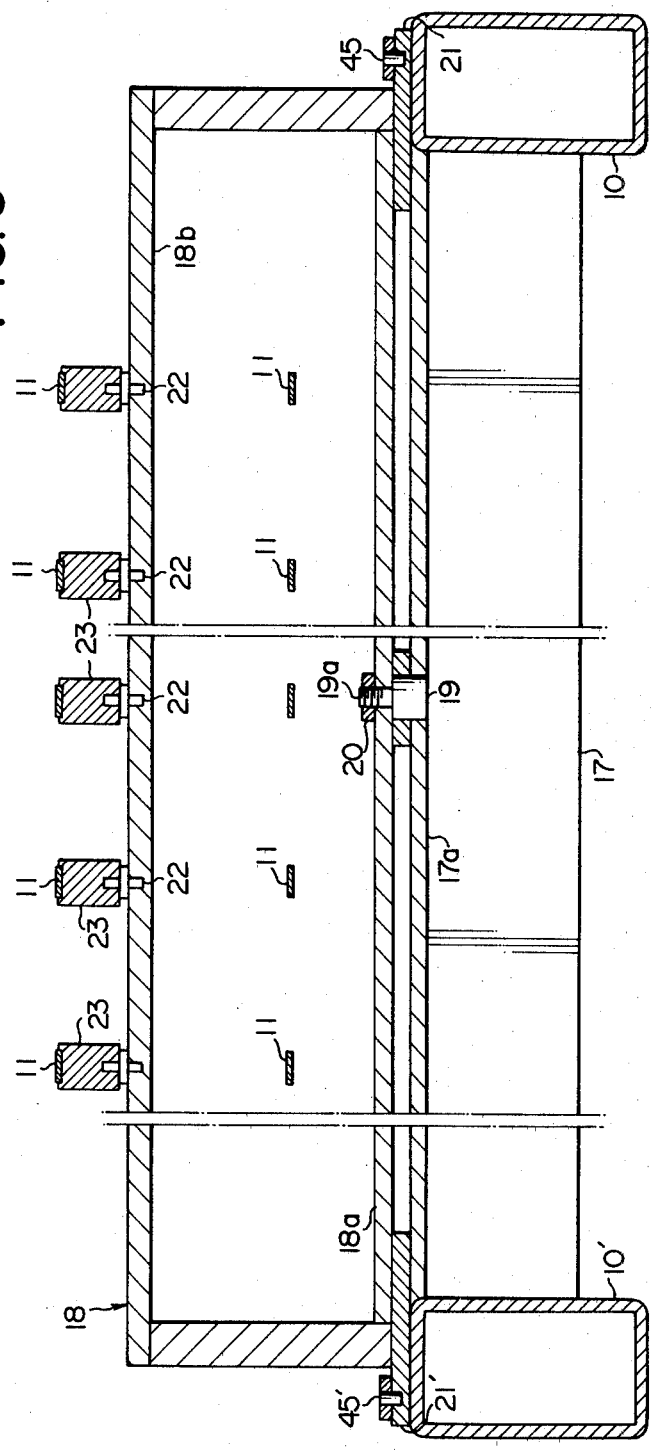
FIG. 3 is a vertical sectional view taken along line III—III in FIG. 1.

Referring first to FIGS. 1 to 3, a sheet joining apparatus embodying the present invention comprises an elongated frame structure including a pair of side frames 10 and 10' which are horizontally spaced in parallel from each other and which extend in directions in which the sheet segments to be joined together and the strip composed of the sheet segments which have been joined to one another are to be conveyed. In the drawings, the direction in which the sheet materials processed and to be processed are to be conveyed is indicated by arrow A. As will be understood as the description proceeds, sheet segments cut to predetermined sizes are conveyed in succession forwardly of the frame structure and are joined to one another in a longitudinally intermediate joining zone Zi (FIG. 1) in the frame structure. Thus, the frame structure further has a rear conveyance zone Zr through which the sheet segments to be joined together are to be conveyed forwardly away from the rearmost end of the frame structure to the intermediate joining zone Zi, and a front conveyance zone Zf through which the strip composed of the sheet segments which have been joined to one another are to be conveyed forwardly away from the joining zone Zi toward the foremost end of the frame structure as shown in FIG. 1.

The sheet joining apparatus embodying the present invention further comprises first sheet conveying means adapted to convey sheet segments forwardly through the above mentioned rear conveyance zone Zr. In FIGS. 1 to 3, such sheet conveying means is shown comprising a plurality of endless conveyor belts 11 which extend in parallel with the side frames 10 and 10' longitudinally between the joining zone Zi and the rear end of the rear conveyance zone Zr and which are spaced apart at equal distances from one another between the side frames 10 and 10' as will be best seen in FIG. 1. Though not shown in the drawings, the conveyor belts 11 have rear turning end portions wrapped round pulleys which are arranged in an array in the joining zone Zi.

Figure 4:
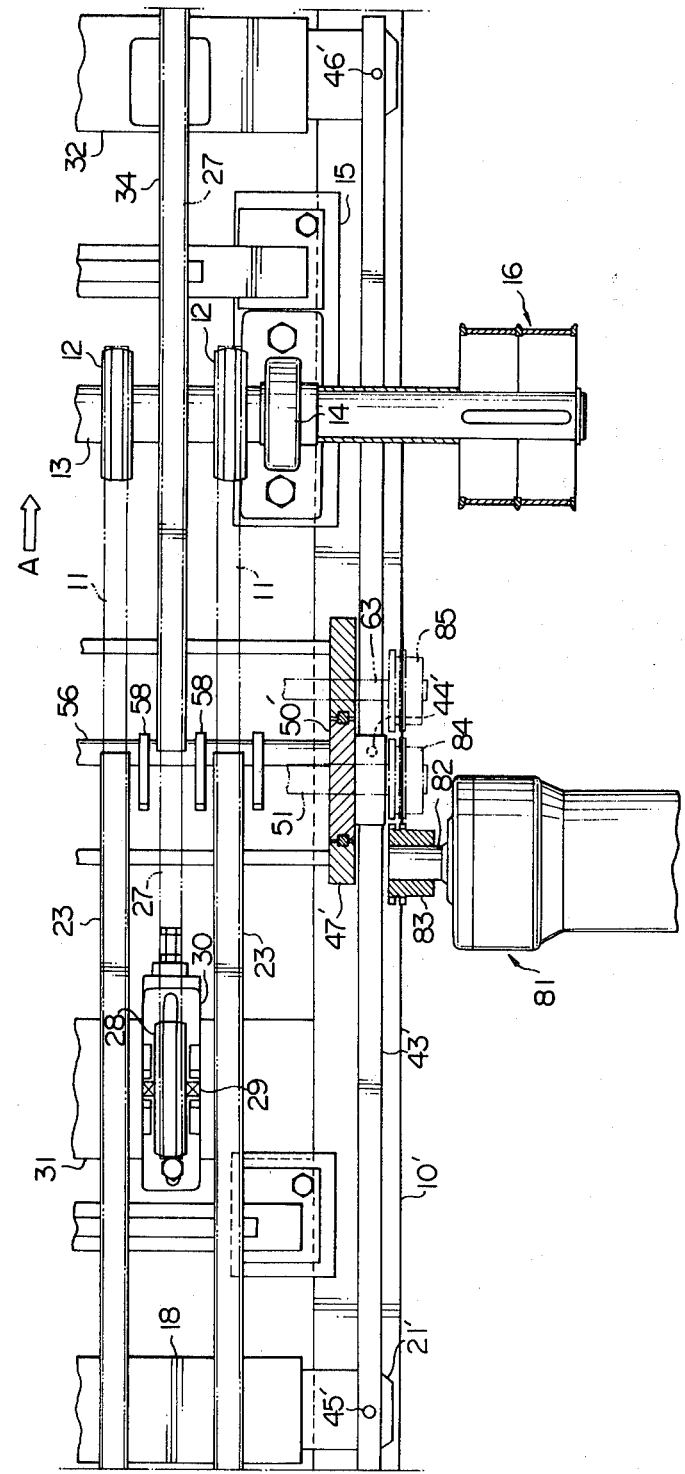
FIG. 4 is a horizontal sectional view showing the sheet joining apparatus viewed from a plane indicated by line IV—IV in FIG. 2.

As will be seen from FIG. 2 and further from FIG. 4, the first sheet conveying means further comprises a plurality of pulleys 12 which are disposed at the foremost end in the intermediate joining zone Zi and which are arranged in an array between the side frames 10 and 10'. The pulleys 12 are carried on a drive shaft 13 having opposite end portions journalled in a pair of pedestals 14 and 14' fixedly mounted on bracket members 15 and 15', respectively. The bracket members 15 and 15' are securely attached to the side frames 10 and 10', respectively, and are located in the vicinity of the foremost end of the joining zone Zi as shown in FIG. 1. The conveyor belts 11 have front turning end portions wrapped round these pulleys 12, respectively. The drive shaft 13 is coupled to suitable drive means such as a motor 16 typically through a suitable reduction gear unit (not shown). The motor 16 and the pulleys 12 are arranged so that the individual conveyor belts 11 are driven to move forwardly of the frame structure, viz., in the direction of the arrow A along the upper straight travelling paths of the belts 11 and backwardly along the lower straight travelling paths of the belts 11 through the rear conveyance zone Zr. The upper surfaces of the conveyor belts 11 are flush with each other along the upper straight travelling paths of the belts 11 and thus jointly define a horizontal main travelling plane in the rear conveyance zone Zr, as will be seen from FIGS. 2 and 3.

The first sheet conveying means further comprises a stationary cross beam 17 located in the vicinity of the foremost end of the rear conveyance zone Zr as shown in FIG. 3. The cross beam 17 has an upper horizontal wall portion 17a extending between the side frames 10 and 10' at the rear of the pulley support bracket members 15 and 15', and opposite end portions respectively secured to the side frames 10 and 10'. The cross beam 17 has formed in its upper wall portion 17a an opening which is located at equal distances from the side frames 10 and 10'. A front swivel frame 18 having spaced, parallel lower and upper wall portions 18a and 18b is positioned above the cross beam 17 and has an opening formed in its lower wall portion 18a, the opening being also located at equal distances from the side frames 10 and 10'. A pivot pin 19 having a threaded stem portion 19a is secured to the cross beam 17 through the opening in the upper wall portion 17a of the beam 17 and upwardly projects through the opening in the lower wall portion 18a of the swivel frame 18. The threaded stem portion 19a of the pivot pin 19 projects upwardly from the swivel frame 18 and is loosely fitted to the frame 18 by means of a nut 20. The swivel frame 18 is thus pivotally movable with respect to the cross beam 17 and to the frame structure about the center axis of the pivot pin 19, viz., a vertical axis which passes through a lengthwise middle point of the frame 18. Preferably, the swivel frame 18 has its opposite end portions slidably received on support plates 21 and 21' securely attached to the upper faces of the side frames 10 and 10', respectively, as shown.

The front swivel frame 18 has its upper wall portion 18b provided with a series of pivot pins 22 which are arranged longitudinally of the frame 18 at predetermined intervals from one another and which project upwardly from the upper wall portion of the frame 18. The number of the pivot pins 22 arranged in this fashion is equal to the number of the conveyor belts 11 and, thus, the spacing between every adjacent two of the pivot pins 22 is equal to the spacing between every adjacent two of the conveyor belts 11. A plurality of elongated guide bars 23 extend in parallel with the side frames 10 and 10' forwardly of the pulleys (not shown) located in the vicinity of the rearmost end of the frame structure and are located immediately underneath the upper straight travelling paths of the conveyor belts 11, respectively. The guide bars 23 thus extend forwardly through the rear conveyance zone Zr and terminate in the intermediate joining zone Zi in the frame structure or, in other words, at the rear of the pulleys 12 on which the conveyor belts 11 are passed, as will be best seen in FIG. 4. Each of the guide bars 23 has a foremost end portion carried on each of the pivot pins 22 and has a shallow horizontal groove formed in its upper face and has each of the conveyor belts 11 slidably received in the groove along the upper straight travelling path of the belt 11. The guide bars 23 have equal lengths and the pivot pins 22 respectively carrying the bars 23 are located at equal distances from the rear ends of the bars 23. Preferably, the bottom surface of the groove in each of the guide bars 23 or, in other words, the above mentioned main travelling plane in the rear conveyance zone Zr is located on a horizontal plane slightly higher by, for example, about 5 mm from the upper ends of the pulleys 12 as will be seen from FIG. 2. Thus, the conveyor belts 11 advancing forwardly past the foremost ends of the guide bars 23 along the upper straight travelling paths thereof are caused to travel along downwardly slanting paths toward the upper ends of the pulleys 12.

The first sheet conveying means of the sheet joining apparatus embodying the present invention further comprises a stationary cross beam 24 located at the rear of the above described cross beam 17. The cross beam 24 extends between the side frames 10 and 10' and has opposite end portions respectively secured to the side frames 10 and 10', as shown in FIG. 1. The cross beam 24 has carried thereon a rear swivel frame 25 which is positioned above the cross beam 24 and immediately underneath the conveyor belts 11. Though not shown in the drawings, the rear swivel frame 25 is carried on the cross beam 24 by means of a suitable pivot pin (indicated in phantom at 26 in FIG. 1) extending upwardly from the cross beam 24 and located at equal distances from the opposite ends of the frame 25. The swivel frame 25 is thus pivotally movable with respect to the cross beam 24 about the pivot pin 26, viz., about a vertical axis which passes through a lengthwise middle point of the frame 25. The swivel frame 25 extends at right angles to the guide bars 23 and are pivotally connected to the guide bars 23 by means of pivot pins which are arranged similarly to the pivot pins 22 on the front swivel frame 17. Thus, a horizontal four-bar linkage is constituted by the combination of the front and rear swivel frames 17 and 25 and every two of the guide bars 23.

The sheet joining apparatus embodying the present invention further comprises second sheet conveying means by which the strip composed of the sheet segments joined together is to be conveyed forwardly through the above mentioned front conveyance zone Zf. In FIGS. 1 to 3, the second sheet conveying means is shown comprising a plurality of endless conveyor belts 27 which extend in parallel with the side frames 10 and 10' longitudinally between the joining zone Zi and the rear end of the rear conveyance zone Zr and which are spaced at equal distances from one another between the side frames 10 and 10'. The conveyor belts 27 are arranged in staggered, viz., alternating relationship to the conveyor belts 11 of the first sheet conveying means and have rear end portions overlapping front end portions of the conveyor belts 11 laterally of the frame structure. Though not shown in the drawings, the conveyor belts 27 have front turning end portions wrapped round pulleys which are arranged in an array in the vicinity of the foremost end of the front conveyance zone Zf and which are driven by suitable drive means such as a motor through a reduction gear unit. The motor and the pulleys driven by the motor are arranged so that the individual conveyor belts 27 are driven to move forwardly of the frame structure, viz., in the direction of the arrow A along the upper straight travelling paths of the belts 27 and backwardly along the lower straight travelling paths thereof through the front conveyance zone Zf. The upper surfaces of the conveyor belts 27 are flush with each other along the upper straight travelling paths of the belts 27 and thus jointly define a horizontal main travelling plane in the front conveyance zone Zf. The main travelling plane in the front conveyance zone Zf is flush with the previously mentioned main travelling plane in the rear conveyance zone Zr as will be seen from FIGS. 2 and 3.

The second sheet conveying means further comprises a plurality of pulleys 28 which are disposed at the rear end of the intermediate joining zone Zi and which are arranged in an array between the side frames 10 and 10' as will be seen from FIGS. 2 and 4. Each of the pulleys 28 has a center shaft 29 having opposite end portions journalled in a pedestal 30 mounted on a cross plate 31 extending between the side frames 10 and 10'. The conveyor belts 27 have rear turning end portions wrapped round these pulleys 28, respectively. The second sheet conveying means further comprises a rear swivel frame 32 located in the vicinity of the rearmost end of the front conveyance zone Zf in the frame structure as shown in FIG. 1. Though not shown in the drawings, the swivel frame 32 is provided immediately above a stationary cross beam secured to and extending between the side frames 10 and 10' and is pivotally carried on the cross beam by means of a pivot pin (indicated in phantom at 33 in FIG. 1) which is located at equal distances from the side frames 10 and 10', similarly to the front swivel frame 18 of the first sheet conveying means. Further similarly to the front swivel frame 18 of the first sheet conveying means, the rear swivel frame 32 has its upper wall portion provided with a series of pivot pins (not shown) which are arranged longitudinally of the frame 32 at predetermined intervals from one another and which project upwardly from the upper wall portion of the frame 32. The number of the pivot pins thus arranged is equal to the number of the conveyor belts 27 and, thus, the spacing between every adjacent two of the pivot pins is equal to the spacing between every adjacent two of the conveyor belts 27. A plurality of elongated guide bars 34 extend forwardly of the pulleys 28 located in the vicinity of the rearmost end in the joining zone Zi and are located immediately underneath the upper straight travelling paths of the conveyor belts 27, respectively. The guide bars 34 thus extend forwardly through the front conveyance zone Zf and terminate at the rear of the pulleys provided in the vicinity of the foremost end of the front conveyance zone Zf. Each of the guide bars 34 has a rear end portion pivotally carried on each of the above mentioned pivot pins and extends in parallel with the side frames 10 and 10' as will be seen from FIG. 4 and, similarly to the guide bars 23 of the first sheet conveying means, has a shallow groove formed in its upper face, having each of the conveyor belts 27 slidably received in the groove along the upper straight travelling path of the conveyor belt 27. The individual guide bars 34 have equal lengths and the pivot pins respectively carrying the bars 34 are located at equal distances from the rear ends of the bars 34. Preferably, the bottom surface of the groove in each of the guide bars 34 is located on a horizontal plane slightly higher by, for example, about 5 mm from the upper ends of the pulleys 28 as will be seen from FIG. 2. Thus, the conveyor belts 27 advancing forwardly past the pulleys 28 along the upper straight travelling paths thereof are caused to travel along upwardly slanting paths toward the rearmost ends of the guide bars 34. A smooth horizontal transfer plane is in this manner provided in the intermediate joining zone Zi from the foremost end portions of the conveyor belts 11 to the rearmost end portions of the conveyor belts 27. The horizontal transfer plane in the joining zone Zi is defined by the upper surfaces of the conveyor belts 11 and 27 travelling along the upper straight travelling paths thereof through the joining zone Zi and is flush with the respective main travelling planes in the rear and front conveyance zones Zr and Zf.

The second sheet conveying means further comprises a stationary cross beam 35 located in front of the cross beam carrying the rear swivel frame 32. The cross beam 35 extends between the side frames 10 and 10' as shown in FIG. 1 and has carried thereon a front swivel frame 36 which is positioned above the cross beam 35 and immediately underneath the conveyor belts 27. Though not shown in the drawings, the swivel frame 36 is also carried on the cross beam 35 by a pivot pin (indicated in phantom at 37 in FIG. 1) extending upwardly from the cross beam 35 and is pivotally connected to the guide bars 34 by pivot pins arranged similarly to the pivot pins 22 on the front swivel frame 17. A horizontal four-bar linkage is thus constituted by the combination of the front and rear swivel frames 32 and 36 and every two of the guide bars 34.

Figure 5:
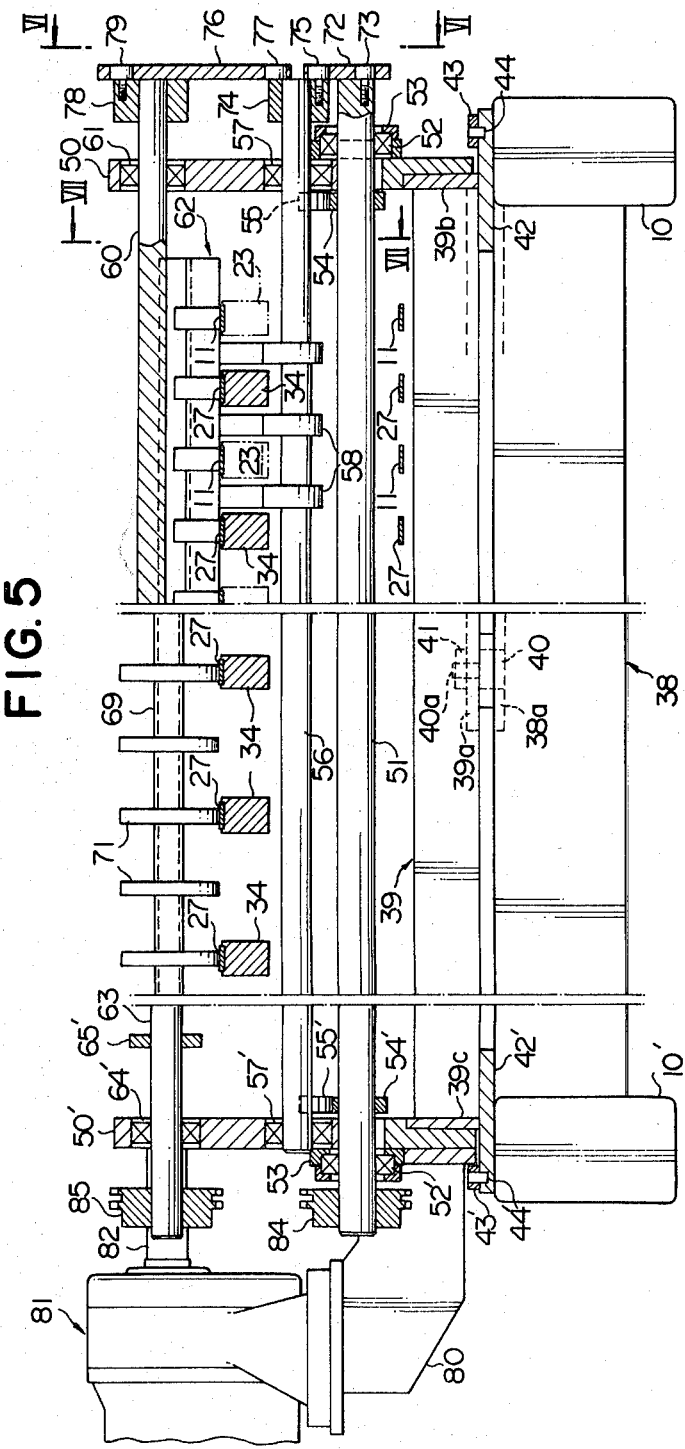
FIG. 5 is a vertical sectional view taken along line V—V in FIG. 2.

The sheet joining apparatus embodying the present invention further comprises first edge-adjusting means provided in the intermediate joining zone Zi. As shown in FIG. 2 and further in FIG. 5, the first edge-adjusting means comprises a stationary cross beam 38 located between the row of the pulleys 12 and the row of the pulleys 28. As shown in FIG. 5, the cross beam 38 has an upper wall portion 38a (FIG. 2) extending between the side frames 10 and 10' and has formed in its upper wall portion 38a an opening located at equal distances from the side frames 10 and 10'. An intermediate swivel frame 39 having a horizontal lower wall portion 39a is positioned above the cross beam 38 and has an opening formed in the lower wall portion 39a, the opening being also located at equal distances from the side frames 10 and 10'. As indicated by broken lines in FIG. 5, a pivot pin 40 having a threaded stem portion 40a is secured to the cross beam 38 through the opening in the upper wall portion 38a of the beam 38 and upwardly projects through the opening in the lower wall portion 39a of the swivel frame 39. The threaded stem portion 40a of the pivot pin 40 projects upwardly from the swivel frame 39 and is loosely fitted to the frame 39 by means of a nut 41 as shown. The swivel frame 39 is thus pivotally movable with respect to the cross beam 38 and to the frame structure about the pivot pin 40, viz., a vertical axis passing through a lengthwise middle point of the frame 39. The swivel frame 39 has its longitudinal opposite end portions slidably received on swivel support plates 42 and 42' which are slidably received on the upper faces of the side frames 10 and 10', respectively, as shown in FIG. 5. An elongated link member 43 has its intermediate portion pivotally mounted on one swivel support plate 42 by means of a pivot pin 44 and extends in parallel with the side frame 10. Likewise, an elongated link member 43' is pivotally mounted on the other support plate 42' by means of a pivot pin 44' and extends in parallel with the side frame 10'. The link member 43 further has its rearmost end portion pivotally connected by means of a pivot pin 45 to the previously mentioned support plate 21 (FIG. 3) supporting the rear swivel frame 18 on the side frame 10 and its foremost end portion pivotally connected by means of a pivot pin 46 to one of the support plates supporting the swivel frame 32 on the side frame 10, as will be best seen from FIG. 1. Similarly, the link member 43' has its rearmost end portion pivotally connected by means of a pivot pin 45' to the support plate 21' (FIG. 3) supporting the rear swivel frame 18 on the side frame 10 and its foremost end portion pivotally connected by means of a pivot pin 46' to the other of the support plates supporting the swivel frame 32 on the side frame 10. Thus, the rear, front and intermediate swivel frames 18, 32 and 39 and the above described link members 43 and 43' constitute in combination a horizontal parallelogrammic link structure which is deformable in its entirety with the swivel frames 18, 32 and 39 maintained in parallel with one another and with the link members 43 and 43' maintained in parallel with each other.

Figure 6:
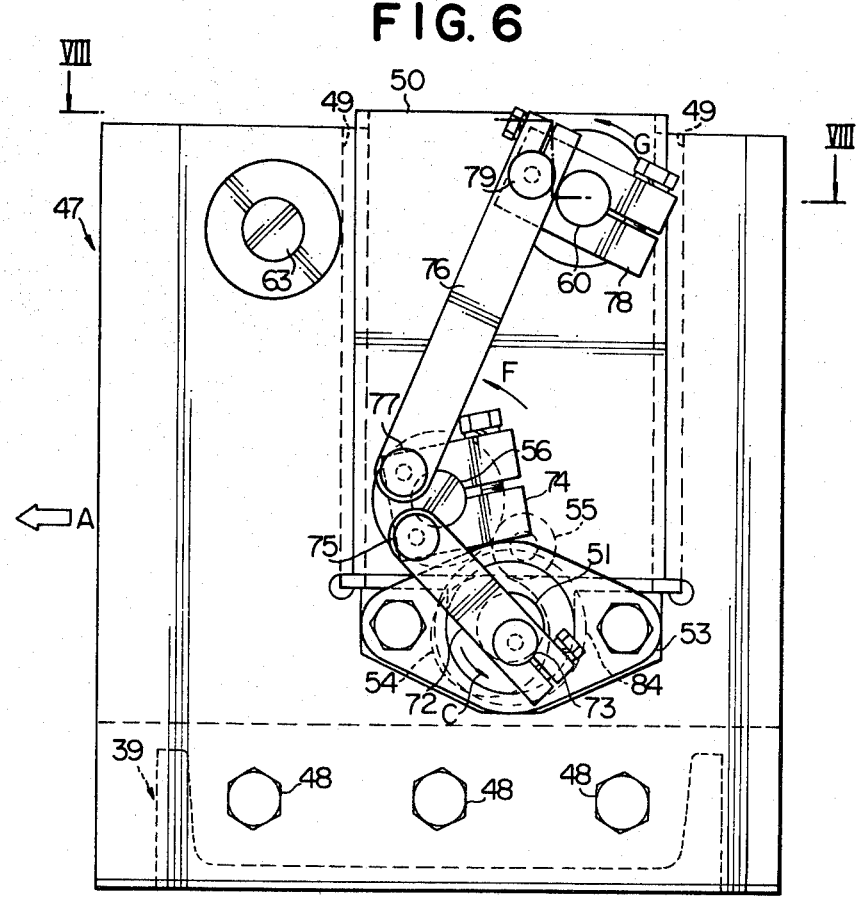
FIG. 6 is a side elevation view showing the sheet joining apparatus viewed from a vertical plane indicated by line VI—VI in FIG. 5.

As will be best seen from FIGS. 5 to 8, the above described intermediate swivel frame 39 has vertical side plate portions 39b and 39c and has a pair of side plates 47 and 47' securely attached to the outer side faces of the plate portions 39b and 39c by suitable fastening means such as bolts 48 (FIG. 6). The side plates 47 and 47' extend upwardly from the swivel support plates 42 and 42', respectively (FIG. 5) and have upper ends located above the previously mentioned horizontal transfer plane in the joining zone Zi. The side plates 47 and 47' are formed with vertical slots 49 and 49', respectively, which are open upwardly and which are defined between vertical front and rear inner edges of the plates 47 and 47', as will be also seen from FIGS. 2 and 4 and better from FIG. 6. A slider plate 50 has its front and rear edges slidably received on the front and rear inner edges (FIG. 8), respectively, thus defining the slot 49 in one side plate 47 and is movable upwardly and downwardly through the slot 49. Likewise, a slider plate 50' has its front and rear edges slidably received on the front and rear inner edges, respectively, defining the slot 49' in the other side plate 47' and is movable upwardly and downwardly through the slot 49'. As will be seen from FIGS. 5 and 6, a main shaft 51 extends between the side plates 47 and 47' and have opposite end portions projecting outwardly from the side plates 47 and 47' through openings formed in those portions of the plates 47 and 47' which are located immediately below the slots 49 and 49', respectively. The end portions of the main shaft 51 are journaled in bearings 52 and 52' retained in bearing retainers 53 and 53', respectively, which are securely attached to the outer side faces of the side plates 47 and 47' as shown in FIG. 5 by means of, for example, bolts as shown in FIG. 6. The main shaft 51 is thus rotatable about an axis parallel with and located above the intermediate swivel frame 39 and has securely mounted thereon a pair of disc-shaped eccentric cam members 54 and 54' which are located in close proximity to the inner faces of the side plates 47 and 47', respectively, as shown in FIG. 5 and which have center axes aligned with each other and offset from the center axis of the shaft 51. Thus, each of the eccentric cam members 54 and 54' has minimum-radius and maximum-radius cam lobe portions which are diametrically opposite to each other across the center axis thereof. The cam members 54 and 54' are held in rollable contact with cam follower rollers 55 and 55', respectively, which are coaxially rotatable on roller shafts (not shown) projecting from the inner side faces of the slider plates 50 and 50', respectively, and which are thus rotatable about an axis parallel with the main shaft 51. The slider plates 50 and 50' are thus driven to move upwardly and downwardly through the slots 49 and 49' in the side plates 47 and 47', respectively, as the main shaft 51 turns about the center axis thereof and accordingly the cam members 54 and 54' on the shaft 51 roll on the cam follower rollers 55 and 55', respectively.

Figure 7:
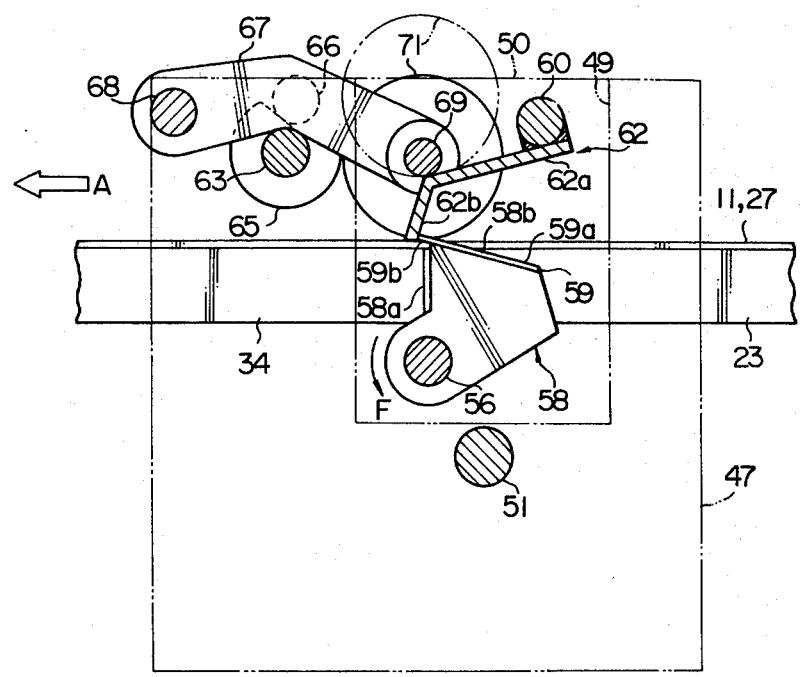
FIG. 7 is a vertical sectional view taken along line VII—VII in FIG. 5.

The first edge-adjusting means further comprises a control shaft 56 (FIGS. 1, 2, 4, 5 and 6) which extends between lower portions of the slider plates 50 and 50' in parallel with the above described main shaft 51 as will be best seen in FIG. 5. The control shaft 56 has opposite end portions journaled in bearings 57 and 57' retained in openings formed in the slider plates 50 and 50', respectively, and is rotatable about an axis parallel with the center axis of the main shaft 51. One end portion of the control shaft 56 projects outwardly from one of the slider plates such as the slider plate 50 as shown in FIG. 5. The guide bars 23 and 34 of the first and second sheet conveying means have their respective foremost and rearmost ends on a vertical plane which passes through the center axis of the control shaft 56, as will be best seen from FIG. 4. The control shaft 56 arranged as above described has securely carried thereon a plurality of edge-adjusting members 58 which are spaced apart from each other at predetermined distances equal to the spacings between the conveyor belts 11 and 27, as shown in FIGS. 4 and 5. Each of the edge-adjusting members 58 is thus located between one of the conveyor belts 11 and one of the conveyor belts 27 and, as will be better seen from FIG. 7, has a front pressing surface 58a on a plane passing through the center axis of the control shaft 56 and an upper ramp surface 58b extending at an acute angle to the front pressing surface 58a and contiguous to the pressing surface 58a at its foremost end and at the upper end of the pressing surface 58a. A guide plate 59 having a smooth upper ride-on surface 59a is securely attached to this ramp surface 58b and has a front edge portion 59b projecting beyond the edge between the pressing and ramp surfaces 58a and 58b. The length to which the front edge portion 59b of the guide plate 59 thus projects from the edge between the surfaces 58a and 58b of each of the edge-adjusting members 58 is predetermined to be equal to the amount of overlap between the individual sheet segments to be joined to one another as will be understood as the description proceeds. The control shaft 56 carrying the edge-adjusting members 58 thus arranged is rotatable about the center axis thereof between a first angular postion (FIG. 9A) in which the front edge portion 59b of the guide plate 59 on each of the edge-adjusting members 58 is located on a horizontal plane slightly below the transfer plane in the intermediate joining zone Zi and a second angular position (FIG. 9c) in which the front edge portion 59b of the guide plate 59 is located immediately above the transfer plane in the intermediate joining zone Zi and is slightly inclined upwardly and forwardly as shown in FIG. 7. When the control shaft 56 assumes the first angular position thereof, the front edge portions 59b of the guide plates 59 are located immediately below and at the rear of the rearmost ends of the guide bars 34 and, when the control shaft 56 assumes the second angular position thereof, the front edge portions 59b of the guide plates 59 are located above and forwardly beyond the rearmost ends of the guide bars 34. The guide plates 59 are caused to move upwardly or downwardly through the individual spacings between the conveyor belts 11 and 27 as the control shaft 56 is turned between the above mentioned first and second angular positions thereof. The guide plate 59 is adapted to guide a leading end portion of sheet segment to slide on the upper ride-on surface 59a of the plate 59 to a position to be lapped on to a trailing end portion of a strip composed of sheet segments joined to one another, as will be understood more clearly as the description proceeds.

The sheet joining apparatus embodying the present invention further comprises second edge-adjusting means located above the first edge-adjusting means arranged as above described. The second edge-adjusting means comprises a control shaft 60 (FIGS. 2, 5, 6 and 7) extending between upper portions of the slider plates 50 and 50' in parallel with the main shaft 51 as will be better seen in FIG. 8. The control shaft 60 has opposite end portions journaled in bearings 61 and 61' retained in openings formed in the slider plates 50 and 50', respectively and is rotatable about an axis parallel with the center axis of the main shaft 51. One end portion of the control shaft 60 projects outwardly from one of the slider plates such as the slider plate 50 as also shown in FIG. 5. The control shaft 60 arranged as above described has securely carried thereon an edge-adjusting member 62 which is elongated between the slider plates 50 and 50' along the control shaft 60 as will be best seen from FIGS. 5 and 6. As will be gathered from the illustrations of FIGS. 7 and 8, the edge-adjusting member 62 has a flat base portion 62a securely attached to the peripheral surface of the control shaft 60 and projecting forwardly from the shaft 60 and a plurality of front edge portions 62b which are bent downwardly and forwardly from the base portion 62a at a predetermined obtuse angle and which are equally spaced apart from each other along the control shaft 60 as will be seen from FIG. 5. The edge portions 62b of the edge-adjusting member 62 are respectively aligned and thus engageable with the guide plates 59 on the edge-adjusting members 58. The control shaft 60 has about the center axis thereof a first angular position (FIG. 9A) in which the front edge portions 62b of the edge-adjusting member 62 have their lower ends located on a predetermined highest level above the horizontal transfer plane in the joining zone Zi, and a second angular position (FIG. 9C) in which the edge portions 62b of the edge-adjusting member 62 have their lower ends located slightly above the transfer plane in the intermediate joining zone Zi. When the control shaft 60 is held in the first angular position thereof, the lower ends of the edge portions 62b of the edge-adjusting member 62 are located above and far ahead of the rearmost ends of the guide bars 34 and, when the control shaft 60 is held in the second angular position thereof, the lower ends of the edge portions 62b are located slightly ahead of the rearmost ends of the guide bars 34. The control shaft 60 further has a third angular position (FIG. 9E) in which the edge portions 62b of the edge-adjusting member 62 have their lower ends located on the horizontal transfer plane in the joining zone Zi as shown in FIG. 7. When the control shaft 60 assumes the third angular position, the lower ends of the edge portions 62b of the edge-adjusting member 62 are located slightly ahead of the rearmost ends of the guide bars 34.

The sheet joining apparatus embodying the present invention further comprises pressing means adapted to press a leading end portion of a sheet segment against a trailing end portion of a strip composed of sheet segments which are joined to one another. As will be best seen from FIG. 8, the pressing means comprises a cam shaft 63 which extends between upper front corner portions of the side plates 47 and 47' and which have opposite end portions projecting outwardly from the side plates 47 and 47', respectively. The end portions of the cam shaft 63 are journaled in bearings 64 and 64' retained in openings formed in the side plates 47 and 47. The cam shaft 63 is thus rotatable about an axis parallel with the control shaft 60 and has securely mounted thereon a pair of generally semi-cylindrical cam members 65 and 65' (FIG. 5) which are located in close proximity to the inner faces of the side plates 47 and 47', respectively, and which have center axes aligned with the center axis of the cam shaft 63. The cam members 65 and 65' are held in rollable contact with cam follower rollers 66 and 66', respectively, which are coaxially rotatable on roller shafts (not shown) projecting from intermediate portions of arm members 67 and 67'. The arm members 67 and 67' have front end portions carried on rollers 68 and 68' which are supported on shafts projecting from the inner side faces of the slide plates 47 and 47', respectively, and which are rotatable about axes aligned with each other and parallel with the center axis of the cam shaft 63. The arm members 67 and 67' and accordingly the cam follower rollers 66 and 66' are thus rockable about the axes of rotation of the rollers 68 and 68', respectively. A roller support shaft 69 extends between rear end portions of the arm members 67 and 67' in parallel with the cam shaft 63 and has threaded opposite end portions securely connected to the arm members 67 and 67' by means of nuts 70 and 70', respectively. The roller support shaft 69 has securely carried thereon a plurality of disc-shaped press rollers 71 which are spaced apart from each other along the shaft 69 and which are located above the horizontal transfer plane in the joining zone Zi as will be seen from FIGS. 2, 5 and 7. The press rollers 71 are respectively aligned with the conveyor belts 11 and 27 extending in the joining zone Zi. The roller support shaft 69 and accordingly the press rollers 71 are thus rockable about the axes of rotation of the above mentioned rollers 68 and 68' as the cam members 65 and 65' are driven for rotation with the cam shaft 63 and roll on the cam follower rollers 66 and 66'.

The sheet joining apparatus embodying the present invention further comprises a mechanical linkage adapted to transmit rotation of the main shaft 51 to the control shafts 56 and 60. As shown in FIGS. 5 and 6, the main shaft 51 has an end portion projecting outwardly from one of the side plates such as the side plate 47 and has a first link member 72 pivotally mounted on the projecting end portion of the shaft 51 by means of a pivot pin 73 in such a manner that the center axis of the pivot pin 73, viz., the axis of pivotal motion of the link member 72 is parallel with and slightly offset from the center axis of the shaft 51. Furthermore, the control shaft 56 carrying the edge-adjusting members 58 also has an end portion projecting outwardly from the slider plate 50 and has a generally U-shaped first connecting member 74 securely mounted on the projecting end portion of the shaft 56. The first link member 72 extends upwardly and forwardly from the pivot pin 73 and has its upper end portion pivotally connected to the first connecting member 74 by means of a pivot pin 75 having a center axis parallel with and slightly offset from the center axis of the control shaft 56. An elongated second link member 76 has a lower end portion pivotally connected to the first connecting member 74 by means of a pivot pin 77 which also has a center axis parallel with and slightly offset from the center axis of the control shaft 56. The control shaft 60 carrying the edge-adjusting member 62 also has an end portion projecting outwardly from the slider plate 50 and has a generally U-shaped second connecting member 78 securely mounted on the projecting end portion. The second link member 76 extends upwardly and slightly rearwardly from the pivot pin 73 and has its upper end portion pivotally connected to the second connecting member 78 by means of a pivot pin 79 which has a center axis parallel with and slightly offset from the center axis of the control shaft 60.

The sheet joining apparatus embodying the present invention further comprises drive means for driving each of the main shaft 51 and cam shaft 63 for rotation about the center axis thereof. As shown in FIG. 5, the drive means comprises a bracket member 80 which is securely attached to the outer side face of the other side plate 47'. The bracket member 80 has fixedly supported thereon a motor 81 provided with a suitable reduction gear unit (not shown). The motor 81 has an output shaft 82 carrying a first sprocket wheel 83 as shown in Figs. 2 and 4. The main shaft 51 has another end portion projecting outwardly from the side plate 47' and has a second sprocket wheel 84 securely carried on the projecting end portion of the shaft 51 as shown in FIGS. 2, 4 and 5. Likewise, the cam shaft 63 has one end portion projecting outwardly from the side plate 47' and has a third sprocket wheel 85 securely carried on the projecting end portion of the shaft 63 as shown in FIGS. 2, 4, 5 and 8. An endless chain 86 is passed on these sprocket wheels 83, 84 and 85 as shown in FIG. 2 so that the main shaft 51 carrying the cam members 54 and 54' (FIG. 5) and the cam shaft 63 carrying the cam members 65 and 65' (FIGS. 5 and 8) are driven for rotation about the respective center axes thereof when the motor 81 is in operation.

Description will now be made with concurrent respect to FIGS. 1 to 8 and further to FIGS. 9A to 9F regarding the operation of the sheet joining apparatus which is constructed and arranged as hereinbefore described.

Figure 9A:
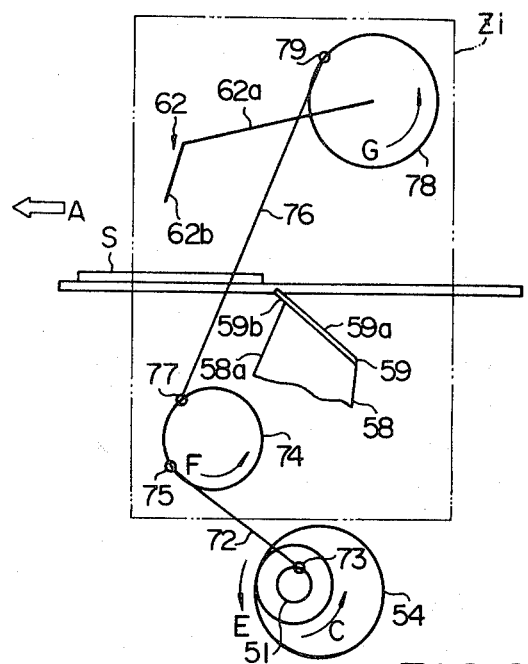
FIGS. 9A to 9F are schematic views showing various operative conditions of the members forming part of pressing and edge-adjusting means of the sheet joining apparatus embodying the present invention.

Upon completion of a cycle of sheet joining operation, a strip composed of two or more rubberized sheet segments which have been joined to one another is carried on the conveyor belts 11 and 27 in the joining zone Zi as indicated at S in FIG. 9A. Under these conditions, the main shaft 51 (FIGS. 5, 6 and 7) is held, about the center axis thereof, in an angular position having the first and second link members 72 and 76 (FIGS. 5 and 6) directed as shown in FIG. 9A. With the link members 72 and 76 thus directed, the control shaft 56 (FIG. 5 and 7) carrying the edge-adjusting members 58 thereon is held in the first angular position having the front edge portions 59b of the guide plates 59 located slightly below the horizontal transfer plane in the joining zone Zi and slightly at the rear of the rearmost ends of the guide bars 34. On the other hand, the control shaft 60 carrying the edge-adjusting member 62 thereon is also held in the first angular position having the edge portions 62b of the edge-adjusting member 62 located at the highest plane above the transfer plane in the joining zone Zi as also shown in FIG. 9A. With the main shaft 51 held in the angular position shown in FIG. 9A, furthermore, the eccentric cam members 54 and 54' (FIG. 5) on the main shaft 51 have their minimum-radius cam lobe portions held in contact with the cam follower rollers 55 and 55′, respectively, so that the slider plates 50 and 50′ (FIGS. 2 and 6) are maintained in their lowermost positions with respect to the side plates 47 and 47′, respectively.

When the motors for the first and second sheet conveying means are started under these conditions, the conveyor belts 11 and 27 are driven to travel at a predetermined constant velocity. The conveyor belts 11 are driven to travel forwardly from the rearmost end of the rear conveyance zone Zr to the foremost end of the joining zone Zi along the upper straight travelling paths thereof as indicated by the arrows A and backwardly from the foremost end of the joining zone Zi to the rearmost end of the rear conveyance zone Zr along the lower straight travelling paths thereof as indicated by arrow A′ in FIG. 2. Likewise, the conveyor belts 27 are driven to travel forwardly from the rearmost end of the joining zone Zi to the foremost end of the front conveyance zone Zf along the upper straight travelling paths thereof and backwardly from the foremost end of the front conveyance zone Zf to the rearmost end of the joining zone Zi along the lower straight travelling paths thereof. The strip S carried on the conveyor belts 11 and 27 in the joining zone Zi is thus conveyed in the direction of the arrow A at a constant velocity away from the rearmost end of the conveyor belts 27. When the strip S reaches a position having its rear trailing edge slightly projecting rearwardly from rearmost ends of the guide bars 34, the motor driving the conveyor belts 27 is brought to a stop so that the conveyor belts 27 cease to travel and as a consequence the strip S is held in the above mentioned position on the conveyor belts 11 and 27. The strip S being held in this position in the joining zone Zi, the front edge portions 59b of the guide plates 59 on the edge-adjusting members 58 (FIG. 7) are located immediately below and at the rear of the trailing edge of the strip S.

Figure 9B:
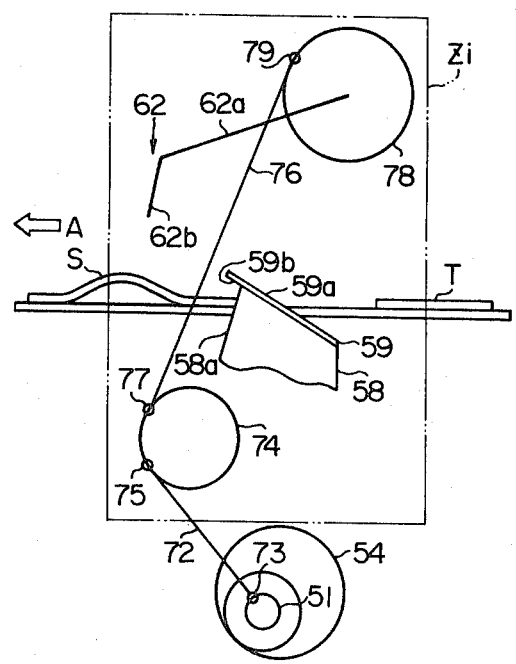

The drive motor 81 (FIGS. 4 and 5) is now actuated to start so that the output shaft 82 thereof is driven for rotation in a direction indicated by arrow B in FIG. 2. The rotation of the output shaft 82 of the motor 81 is transmitted through the sprocket wheel (FIGS. 2 and 4) on the motor output shaft 82 and the endless chain 86 to the sprocket wheel 84 on the main shaft 51 and the sprocket wheel 85 on the cam shaft 63. The main shaft 51 is therefore driven for rotation in a direction indicated by arrow C in FIGS. 2 and 9A and, likewise the cam shaft 63 is driven for rotation in a direction indicated by arrow D in FIG. 2. By the rotation of the main shaft 51 thus driven by the sprocket wheel 84, the cam members 54 and 54′ on the shaft 51 are caused to turn about the center axis of the shaft 51 past the angular positions having their minimum-radius cam lobe portions contacted by the cam follower 25 rollers 55 and 55′, respectively, on the slider plates 50 and 50′ (FIGS. 2 and 6). It therefore follows that the cam follower rollers 55 and 55′ and the slider plates 50 and 50′ are caused to move upwardly with respect to the side plates 47 and 47′ through the slots 49 and 49′ in the side plates 47 and 47′, respectively. The rotation of the main shaft 51 is further transmitted through the pivot pin 73 to the first link member 72 (FIGS. 5 and 6), which is accordingly caused to turn about the center axis thereof and further about the center axis of the main shaft 51 as indicated by arrow E in FIG. 9A. Such a turning motion of the first link member 72 is transmitted through the pivot pin 75 and first connecting member 74 to the control shaft 56. As a result of the upward movement of slider plates 50 and 50′ and the turning motion of the first link member 72, the control shaft 56 to which the connecting member 74 is secured is caused to turn from the first angular position toward the second angular position thereof as indicated by arrow F in FIGS. 6, 7 and 9A. The control shaft 56 being thus driven for rotation in the direction of the arrow F, the edge-adjusting members 58 (FIG. 7) carried on the shaft 56 are caused to turn about the center axis of the shaft 56, with the result that the front edge portions 59b of the guide plates 59 project upwardly and forwardly above the transfer plane in the joining zone Zi through the spacings between the conveyor belts 11 and 27, as indicated in FIG. 9B. As the control shaft 56 is turned from the first angular position toward the second angular position thereof, the front pressing surfaces 58a of the edge-adjusting members 58 are brought into abutting contact with the trailing edge of the strip S held in the above described position. A trailing portion of the strip S is thus forced forwardly on the conveyor belts 11 and 27 so that the strip S is caused to partially swell or undulate upwardly above the horizontal transfer plane in the joining zone Zi along the control shaft 6 carrying the edge-adjusting members 58 as indicated in Fig. 9B with the lower surface of a leading end portion of the rubberized strip S stuck to the upper surfaces of the conveyor belts 11 and 27. The strip S on the conveyor belts 11 and 27 is in this fashion urged to have its trailing edge directed in parallel with the control shaft 56 throughout the width of the strip. While the control shaft 56 is being driven for rotation from the first angular position toward the second angular position thereof, the front pressing surfaces 58a of the edge-adjusting members 58 on the control shaft 56 are slightly inclined downwardly and forwardly as shown in FIGS. 9A and 9B.

In the meantime, the rotation of the cam shaft 56 is further transmitted through the first connecting member 74, pivot pin 77, second link member 76, pivot pin 79 and second connecting member 78 to the control shaft 60 carrying the edge-adjusting member 62 (FIGS. 5 and 7) thereon and causes the control shaft 60 to turn in a direction indicated by arrow G in FIGS. 6 and 9A, viz., from the first angular position toward the second angular position thereof. The edge-adjusting member 62 on the control shaft 60 is thus turned about the center axis of the shaft 60 in a direction to downwardly approach the transfer plane in the joining zone Zi and rearwardly approach the rearmost ends of the guide bars 34 while the strip S on the conveyor belts 11 and 27 is being caused to swell or wave as above described. While the edge-adjusting member 62 is being thus turned from the first angular position toward the second angular position thereof, the sheet segment to be joined to the strip S is placed on the conveyor belts 11 as indicated at T in FIG. 9B. The motor 16 (FIG. 1) for the first sheet conveying means is then actuated to drive the conveyor belts 11 so that the sheet segment T on the conveyor belts 11 is caused to travel in the direction of the arrow A as shown in FIG. 9B. Under these conditions, the strip S is moving from the conveyor belts 11 to the conveyor belts 27 with the conveyor belts 11 being driven to travel.

Figure 9C:
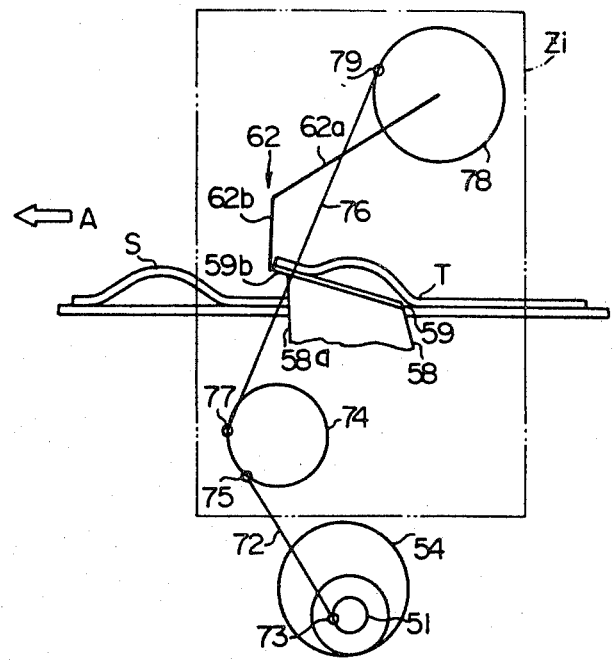

As the main shaft 51 is further driven for rotation, the cam members 54 and 54′ on the shaft 51 reach the angular positions having their maximum-radius lobe portions contacted by the cam follower rollers 55 and 55′, respectively, so that the slider plates 50 and 50′ (FIGS. 6 and 7) reach the uppermost positions with respect to the side plates 47 and 47', respectively. Simultaneously as the slider plates 50 and 50' thus reach their uppermost positions, the control shaft 56 reaches the second angular position thereof so that the front edge portions 59b of the edge-adjusting members 58 are located above a trailing end portion of the strip S and the upper ride-on surfaces 59a of the guide plates 59 on the edge-adjusting members 58 are slightly inclined upwardly and forwardly from the transfer plane in the joining zone Zi as shown in FIG. 9C . When the control shaft 56 thus assumes the second angular position thereof, furthermore, the front pressing surfaces 58a of the edge-adjusting members 58 extend in a common, approximately vertical plane as will also be seen from FIG. 9C so that the trailing edge of the strip S on the conveyor belts 11 and 17 is caused to extend strictly in parallel with the control shaft 56 throughout the width of the strip S. The control shaft 60 is also further driven to turn from the first angular position toward the second angular position thereof so that the edge portions 62b of the edge-adjusting member 62 are further turned about the center axis of the shaft 60 toward the front edge portions 59b of the edge-adjusting members 59 on the control shaft 56.

The conveyor belts 11 being driven to travel as above mentioned, the sheet segment T on the belts 11 is conveyed in the direction of the arrow A and is caused to have its leading end portion received on the upwardly slanting upper ride-on surfaces 59a of the guide plates 59 as shown in FIG. 9C. At an instant when the sheet segment T reaches a position in which the leading end portion of the segment T projects beyond the front edge portions 59b of the guide plates 59, the motor 16 is brought to a stop so that the sheet segment T is maintained at rest in the position partially received on the upper ride-on surfaces 59a of the guide plates 59. At this stage of operation, the control shaft 60 reaches the second angular position thereof so that the edge-adjusting member 62 assumes about the center axis of the shaft 60 an angular position having the edge portions 62b of the edge-adjusting member 62 moved toward the front edge portions 59b of the guide plates 59 rearwardly in the joining zone Zi and thus brought into pressing contact with the leading edge of the sheet segment T. A leading end portion of the sheet segment T is therefore urged to move rearwardly on the upper ride-on surfaces 59a of the guide plates 59 and is caused to swell or undulate upwardly above the upper ride-on surfaces 59a of the guide plates 59 throughout the width of the sheet segment T as shown in FIG. 9C. The leading edge of the sheet segment T is in this fashion caused to extend strictly in parallel with the control shaft 60 and accordingly with the trailing edge of the strip S located immediately in front of the sheet segment T.

Figure 9D:
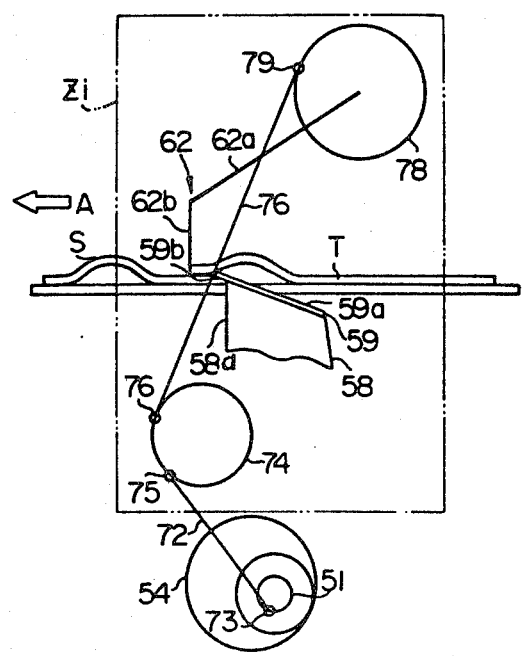
Figure 9E:
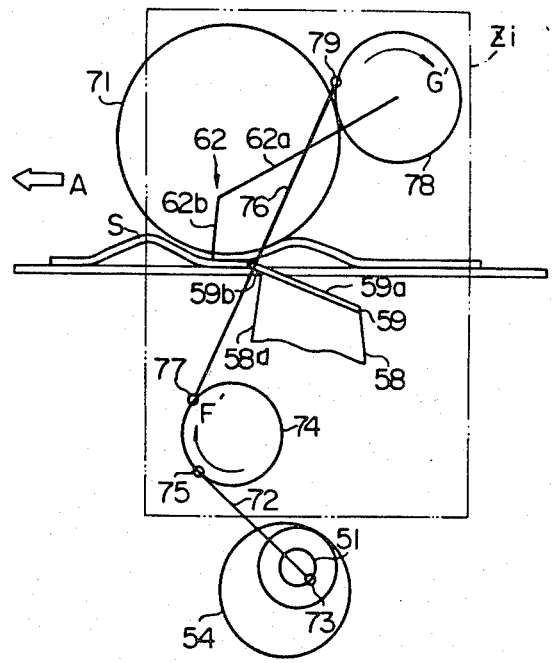

As the main shaft 51 is further turned about the center axis thereof, the cam members 54 and 54' thereon are turned past the angular position having their maximum-radius cam lobe portions contacted by the cam follower rollers 55 and 55', respectively. It therefore follows that the slider plates 50 and 50' which have been raised to the uppermost positions thereof are caused to move downwardly through the slots 49 and 49' in the side plates 47 and 47', respectively. For some time after the slider plates 50 and 50' are moved downwardly from the uppermost positions thereof, the angular position of the control shaft 56 is maintained unchanged due to the composite motions of the first link member 72 which is being caused to turn about the center axis of the main shaft 51 in the direction of the arrow C (FIG. 9A) while the upper end of the link member 72 is being moved downwardly together with the slider plate 50. The edge-adjusting members 58 on the control shaft 56 are therefore caused to move downwardly through the transfer plane in the joining zone Zi without being turned about the center axis of the control shaft 56. The front pressing surfaces 58a of the edge-adjusting members 58 are for this reason maintained to extend vertically while the edge-adjusting members 58 are being moved downwardly, maintaining the strip S closely contacted by the pressing surfaces 58a along the trailing edge of the strip S and thereby enabling the trailing edge of the strip S to extend strictly in parallel with the leading edge of the sheet segment T. As the edge-adjusting members 58 are moved downwardly through the spacings between the conveyor belts 11 and 27, the front edge portions 59b of the guide plates 59 have their lower faces received on and thus overlap the trailing end portion of the strip S as shown in FIG. 9D so that the trailing edge of the strip S is held in parallel with the leading edge of the sheet segment T not only by the front pressing surfaces 58a of the edge-adjusting members 58 but also by the front edge portions 59b of the guide plates 59 as shown in FIG. 9D. At this point of time, the control shaft 60 assumes an angular position having the lower ends of the edge portions 62b located upwardly past the foremost edges of the guide plates 59 and in rearwardly pressing engagement with the leading edge of the sheet segment T as shown in FIG. 9D. Thus, the sheet segment T is still maintained in a position having its leading edge in parallel with the trailing edge of the strip S. When the edge portions 59b of the guide plates 59 are then moved past the transfer plane in the joining zone Zi, the leading end portion of the sheet segment T is superposed on and thus transferred to the trailing end portion of the strip S. Under these conditions, the control shaft 60 assumes the third angular position thereof and has the edge portions 62b of the edge-adjusting member 62 received at their lower ends on the leading end portion of the sheet segment T received on the trailing end portion of the strip S as shown in FIG. 9E. On the other hand, the control shaft 56 assumes an angular position having the front edge portions 59b of the guide plates 59 held in contact with the lower surface of the leading end portion of the sheet segment T as shown in FIG. 9E.

As will be understood from the foregoing description, the amount of overlap between the trailing end portion of the strip S and the leading end portion of the sheet segment T is determined by the length to which the front edge portions 59b of the guide plates 59 project forwardly beyond the upper ends of the front pressing surfaces 58a of the edge-adjusting members 58. If it is desired to have available a reduced amount of overlap between the strip S and the sheet segment T to be joined to the strip S, each of the edge portions 62b of the edge-adjusting member 62 may be formed on its rear side with a groove which extends throughout the width of the edge portion, though not shown in the drawings. In this instance, the front edge portions 59b of the guide plates 59 are permitted to partially enter the grooves thus formed in the front edge portions 62b of the edge-adjusting members 62 so that the effective length to which the edge portions 59a of the guide plates 59 project beyond the pressing surfaces 58a of the edge-adjusting members 58 can be reduced.

By the point of time the guide plates 59 on the edge-adjusting members 58 are moved below the transfer plane in the joining zone Zi, the cam members 65 and 65' on the cam shaft 63 (FIGS. 7 and 8) being driven by the motor 81 through the endless chain 86 (FIG. 2) are rotating about the center axis of the shaft 63 with their semi-cylindrical peripheral surface held in rolling contact with the cam follower rollers 66 and 66' on the arm members 67 and 67', respectively. The press rollers 71 and 71' carried on the roller support shaft 69 are therefore held in positions raised above the transfer plane in the joining zone Zi as indicated in phantom in FIG. 7. When the guide plates 59 are moved below the transfer plane in the joining zone Zi and the leading end portion of the sheet segment T is transferred to the trailing end portion of the strip S as above described, the cam shaft 63 assumes an angular position having the diametral faces of the cam members 65 and 65' contacted by the cam follower rollers 66 and 66', respectively, as shown in FIG. 7. It therefore follows that the arm members 67 and 67' are allowed to turn downwardly about the center axis of the cam shaft 68 so that the press rollers 71 on the roller support shaft 69 are brought into pressing contact with the leading end portion of the sheet segment T as shown in FIG. 9E. The leading end portion of the sheet segment T is thus pressed against the trailing end portion of the strip S by the row of press rollers 71 throughout the width of the sheet segment T.

Figure 9F:
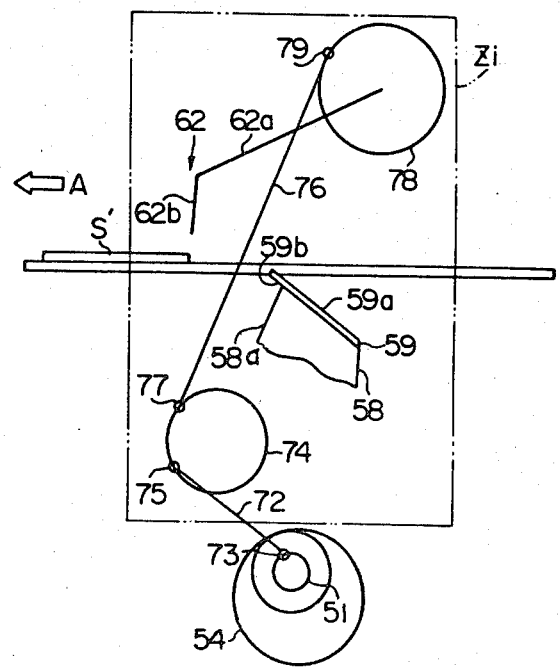

As the main shaft 51 is further turned thereafter, the control shaft 56 carrying the edge-adjusting members 58 is caused to turn in the opposite direction, viz., in a direction indicated by F' in FIG. 9E toward the initial first angular position thereof. The edge-adjusting members 58 on the control shaft 56 are, accordingly, downwardly withdrawn from the lower surface of the leading end portion of the sheet segment T which has been joined to the strip S as indicated in FIG. 9F. The control shaft 60 carrying the edge-adjusting member 62 is also caused to turn in the opposite direction from the third angular position thereof as indicated by arrow G' in FIG. 9E so that the edge-adjusting member 62 as a whole is moved upwardly away from the strip S' on the conveyor belts 11 and 27 as shown in FIG. 9F. The cam shaft 63 carrying the cam members 65 and 65' is also further turned and has the semi-cylindrical peripheral surfaces of the cam members 65 and 65' contacted for a second time by the cam follower rollers 66 and 66', respectively. The press rollers 71 are thus caused to turn upwardly with the arm members 67 and 67' away from the strip S' which is now composed of the original strip S and the additional sheet segment T, as also shown in FIG. 9F. The strip S' on the conveyor belts 11 and 27 is in these manners freed from the edge-adjusting members 58 and 62 and the press rollers 71. The motor (not shown) for the second sheet conveying means is then actuated to drive the conveyor belts 27 for a predetermined short period of time so that the strip S' which is two-fold swollen or undulated is longitudinally stretched flat throughout its area. The motors for both of the first and second sheet conveying means are then put into operation driving the conveyor belts 11 and 27 at a predetermined constant velocity for thereby conveying the strip S' from the joining zone Zi to the foremost end of the front conveyance zone Zf. By the time the strip S' is conveyed forwardly from the joining zone Zi, the main shaft 51 carrying the cam members 54 and 54' is turned to an angular position having the minimum-radius cam lobe portions of the cam members 54 and 54' contacted by the cam follower rollers 55 and 55', respectively (FIGS. 2 and 6). The slider plates 50 and 50' are thus moved through the slots 49 and 49' in the side plates 47 and 47' to their lowermost positions with respect to the side plates 47 and 47', respectively. This puts an end to a cycle of operation to have a sheet segment T joined to the strip S. An elongated strip composed of a number of sheet segments which are joined to one another can thus be produced by repetition of such a cycle of operation.

If an elongated strip is to be composed of sheet segments which are cut at a smaller or larger bias angle, the sheet joining apparatus embodying the present invention can be readily adjusted to suit such sheet segments. For this purpose, at least one of the link members 43 and 43' (FIG. 1) is endwise moved forwardly or backwardly of the frame structure either manually or by the use of suitable drive means (not shown). Since the link members 43 and 43' and the swivel frames 18, 32 and 39 form part of a four-bar link structure as previously described, the movement of at least one of the link members 43 and 43' causes the swivel frames 18, 32 and 39 (FIGS. 1 and 5) to turn clockwise or counterclockwise about the pivot pins 19, 33 and 40, respectively, with respect to the side frames 10 and 10'. The swivel frames 18, 32 and 39 being thus turned, the cam shafts 51 and 63 and press roller support shaft 69 supported by the frame 39 through the side plates 47 and 47' and the control shafts 56 and 60 supported by the frame 39 through the side plates 47 and 47' and the slider plates 50 and 50' are also re-directed in parallel with the swivel frames 18, 32 and 39. Because, furthermore, of the fact that the combination of the swivel frames 18 and 25 and every two of the guide bars 23 and the combination of the swivel frame 32 and 36 and every two of the guide bars 34 also constitute four-bar link structures, the swivel frames 25 and 36 are also turned about the pivot pins 26 and 37, respectively, and are thus re-directed in parallel with the swivel frames 18 and 32. Furthermore, the guide bars 23 and 34 are re-arranged to have their respective foremost and rearmost ends located on a vertical plane passing through the center axis of the control shaft 56 which has been re-directed in parallel with the swivel frames 18, 32 and 39. If at least one of the link members 43 and 43' is endwise moved a distance to cause each of the swivel frames to turn through an angle to suit the increased or decreased bias angle of the sheet segments to be put to use, the apparatus as a whole can thus be adjusted to be capable of processing such sheet segments.

What is claimed is:

1. A sheet joining apparatus for joining a plurality of sheet segments to one another to form an elongated strip which is lengthwise composed of the sheet segments, comprising an elongated frame structure having rearmost and foremost ends and defining therein a front conveyance zone extending forwardly from the rearmost end of the frame structure, a rear conveyance zone extending rearwardly from the foremost end of the frame structure and an intermediate joining zone extending between the rear and front conveyance zones;

first sheet conveying means operative to convey each of said sheet segments forwardly away from the rearmost end of said rear conveyance zone to said joining zone;

second sheet conveying means operative to convey a strip formed in said joining zone forwardly from said joining zone toward the foremost end of said front conveyance zone;

the first and second conveying means overlapping each other in said joining zone transversely of said frame structure and forming a horizontal transfer plane in said joining zone;

first edge-adjusting means provided in said joining zone and comprising a plurality of pressing surfaces which are arranged in alignment with each other on a vertical plane directed at a predetermined angle to a transverse direction of said frame structure and which are angularly movable about an axis fixed with respect to said frame structure and parallel with said vertical plane each between a generally vertical first angular position lower than said transfer plane and a second angular position higher than said transfer plane, and a plurality of upper ride-on surfaces which are arranged in parallel with said vertical plane and which are angularly movable with said pressing surfaces about said axis each between a first angular position lower than said transfer plane and a forwardly and upwardly slanting second angular position having its foremost end located above said transfer plane and its rearmost end located below said transfer plane, the pressing surfaces in the second angular positions thereof being engageable with the trailing edge of said strip for forcing a trailing end portion of the strip forwardly in said joining zone and thereby causing the trailing edge of the strip to extend in parallel with said vertical plane when said strip is located immediately in front of the pressing surfaces, and the ride-on surfaces in the second angular positions thereof being operative to guide a leading end portion of a sheet segment to slide on the ride-on surfaces to a angular position vertically overlapping the trailing end portion of the strip formed in said joining zone;

second edge-adjusting means comprising a plurality of downwardly directed edge portions which are positioned above said ride-on surfaces and which are arranged in parallel with said vertical plane, the edge portions being angularly movable about an axis fixed with respect to said frame structure and parallel with said vertical plane each between a first angular position having its lowermost end located on a predetermined horizontal plane above said transfer plane, a second angular position having its lower end located below said predetermined horizontal plane and above said transfer plane and a third angular position having its lowermost end located on said transfer plane, the edge portions in the second angular positions thereof being engageable with the leading edge of a sheet segment forwardly conveyed into said joining zone by said first conveying means for causing the leading edge of the segment to extend in parallel with said vertical plane; and pressing means provided in said joining zone and arranged in parallel with said vertical plane, the pressing means being operative to press the leading end portion of the sheet segment against the trailing end portion of said strip in said joining zone after said ride-on surfaces are withdrawn from said second angular positions to said first angular positions thereof with the leading end portion of the sheet segment lapped onto the trailing end portion of said strip.

2. A sheet joining apparatus as set forth in claim 1, in which said ride-on surfaces project forwardly to a predetermined length beyond the upper ends of said pressing surfaces.

3. A sheet joining apparatus as set forth in claim 1, in which said first conveying means comprises a plurality of endless conveyor belts extending longitudinally through said rear conveyance zone and said joining zone and spaced apart in parallel from each other transversely of the frame structure and said second conveying means comprises a plurality of endless conveyor belts extending longitudinally through said front conveyance zone and said joining zone and spaced apart in parallel from each other transversely of the frame structure, the conveyor belts of each of the first and second conveying means being to be driven to travel forwardly of the frame structure along the upper straight travelling paths thereof, the conveyor belts of the first conveying means and the conveyor belts of the second conveying means being arranged alternately to each other transversely of the frame structure, wherein the pressing and ride-on surfaces of said first edge-adjusting means are movable between the first and second angular positions thereof vertically through the spacings between the conveyor belts of the first and second conveying means and the edge portions of said second edge adjusting means are movable between the first and third angular positions thereof above the spacings between the conveyor belts of the first and second conveying means.

4. A sheet joining apparatus as set forth in claim 2, in which said first conveying means further comprises elongated guide bars longitudinally extending through said rear conveyance zone and said joining zone and respectively having slidably received thereon the conveyor belts of the first conveying means along the upper straight travelling paths of the belts and said second conveying means further comprises elongated guide bars longitudinally extending through said front conveyance zone and said joining zone and respectively having slidably received thereon the conveyor belts of the second conveying means along the upper straight travelling paths of the belts, the foremost ends of the guide bars of the first conveying means and the rearmost ends of the guide bars of the second conveying means being located on a plane parallel with said vertical plane.

5. A sheet joining apparatus as set forth in claim 4, further comprising a pair of spaced, parallel side plates located on both sides of said joining zone and a pair of slider plates vertically slidable on said side plates, respectively, between predetermined lowermost and uppermost positions with respect to the side plates, a horizontal main shaft axially extending in parallel with said vertical plane and having opposite end portions respectively journaled in said side plates, a pair of eccentric cam members rotatable with said main shaft about the center axis of the main shaft and having respective center axes aligned with each other and offset in parallel from the center axis of the main shaft, and a pair of cam follower rollers which are rotatable about respective axes fixed with respect to said slider plates and parallel with the center axis of said main shaft and which are held in rollable contact with said eccentric cam members, respectively, for thereby driving said slider plates to move upwardly and downwardly with respect to said side plates as said main shaft is driven for rotation about the center axis thereof, said first edge-adjusting means further comprising a control shaft axially extending in parallel with said main shaft and having opposite end portions respectively journaled in said slider plates, said pressing and ride-on surfaces being rotatable with said control shaft, said second edge-adjusting means further comprising a control shaft axially extending in parallel with said main shaft and having opposite end portions respectively journaled in said slider plates, said edge portions being rotatable with said control shaft of the second edge-adjusting means.

6. A sheet joining apparatus as set forth in claim 5, in which the foremost ends of the guide bars of the first conveying means and the rearmost ends of the guide bars of the second conveying means are located on a plane which is vertically aligned with the center axis of the control shaft of said first edge-adjusting means.

7. A sheet joining apparatus as set forth in claim 5, further comprising a first connecting member coaxially rotatable with the control shaft of the first edge-adjusting means, a second connecting member coaxially rotatable with the control shaft of the second edge-adjusting means, a first link member pivotally connected to said main shaft and rotatable with respect to the main shaft about an axis parallel with and offset from the center axis of the main shaft, and a second link member pivotally connected to said first connecting member and said second connecting member and rotatable with respect to the first connecting member about an axis parallel with and offset from the center axis of the control shaft of the first edge-adjusting means and with respect to the second connecting member about an axis parallel with and offset from the center axis of the control shaft of the second edge-adjusting means.

8. A sheet joining apparatus as set forth in claim 4, wherein said first conveying means further comprises a front swivel frame which extends longitudinally in parallel with said vertical plane throughout the transverse coverage of said guide bars of the first conveying means and which is located immediately at the rear of said joining zone, and a rear swivel frame which extends longitudinally in parallel with said vertical plane throughout the transverse coverage of said guide bars of the first conveying means and which is rearwardly spaced apart from said front swivel frame, each of the front and rear swivel frames being rotatable about a vertical axis located at substantially equal distances from the opposite ends of the frame and fixed with respect to said frame structure, each of said guide bars of the first conveying means being pivotally connected to each of the front and rear swivel frames so that the front and rear swivel frames and every two of the guide bars of the first conveying means constitute a horizontal four-bar linkage, and wherein said second conveying means further comprises a rear swivel frame which extends longitudinally in parallel with said vertical plane throughout the transverse coverage of said guide bars of the second conveying means and which is located immediately in front of said joining zone, and a front swivel frame which extends longitudinally in parallel with said vertical plane throughout the transverse coverage of said guide bars of the second conveying means and forewardly spaced apart from said rear swivel frame, each of the rear and front swivel frames of the second conveying means being rotatable about a vertical axis located at substantially equal distances from the opposite ends of the frame and fixed with respect to said frame structure, each of said guide bars of the second conveying means being pivotally connected to each of the rear and front swivel frames of the second conveying means so that the rear and front swivel frames and every two of the guide bars of the second conveying means constitute a horizontal four-bar linkage.

9. A sheet joining apparatus as set forth in claim 8, further comprising an intermediate swivel frame provided in said joining zone and extending longitudinally in parallel with said vertical plane throughout the transverse coverage of said guide bars of the first and second conveying means, the intermediate swivel frame being rotatable about a vertical axis located at substantially equal distances from the opposite ends of the frame and fixed with respect to said frame structure, and a pair of link members longitudinally extending through said joining zone and spaced apart in parallel from each other transversely across said joining zone, each of the link members being pivotally connected to said front swivel frame of the first conveying means and said rear swivel frame of the second conveying means, said front swivel frame of the first conveying means, said rear swivel frame of the second conveying means, said intermediate swivel frame and said link members constituting a horizontal four-bar link structure.

* * * * *

UNITED STATES PATENT AND TRADEMARK OFFICE
CERTIFICATE OF CORRECTION

PATENT NO. : 4,455,189

DATED : June 19, 1984

INVENTOR(S) : Yutaka TAKASUGA

It is certified that error appears in the above-identified patent and that said Letters Patent is hereby corrected as shown below:

On the Title Page:

Please add to Item [30] the following omitted Foreign Application Priority Data:

--July 9, 1982 [JP]    Japan.....120263--

Signed and Sealed this

Twenty-sixth Day of March 1985

[SEAL]

Attest:

DONALD J. QUIGG

Attesting Officer    Acting Commissioner of Patents and Trademarks